(12) United States Patent
Roberts et al.

(10) Patent No.: US 7,568,346 B2
(45) Date of Patent: Aug. 4, 2009

(54) METHOD AND APPARATUS FOR ASSEMBLING A FLAMEHOLDER FOR AN AUGMENTER

(75) Inventors: Brian Benscoter Roberts, Malden, MA (US); Kenneth Arthur Gould, Charlestown, MA (US); Jeffrey Carl Mayer, Swampscott, MA (US)

(73) Assignee: General Electric Company, Schenectady, NY (US)

( * ) Notice: Subject to any disclaimer, the term of this patent is extended or adjusted under 35 U.S.C. 154(b) by 361 days.

(21) Appl. No.: 11/554,687

(22) Filed: Oct. 31, 2006

(65) Prior Publication Data
US 2008/0098740 A1 May 1, 2008

(51) Int. Cl.
*F02K 3/00* (2006.01)
(52) U.S. Cl. .......................... 60/761; 60/763
(58) Field of Classification Search ............... 60/761, 60/763, 765, 762; 138/108, 112, 113
See application file for complete search history.

(56) References Cited

U.S. PATENT DOCUMENTS

| | | | | |
|---|---|---|---|---|
| 3,670,501 A | * | 6/1972 | Arand | 60/763 |
| 3,765,178 A | * | 10/1973 | Hufnagel et al. | 60/765 |
| 3,931,707 A | * | 1/1976 | Vdoviak | 60/765 |
| 4,203,285 A | | 5/1980 | Hanloser et al. | |
| 4,901,527 A | * | 2/1990 | Nash et al. | 60/765 |
| 5,076,062 A | | 12/1991 | Abreu | |
| 5,778,658 A | * | 7/1998 | Lamando et al. | 60/204 |
| 6,334,303 B1 | * | 1/2002 | Berglund et al. | 60/765 |
| 2006/0042227 A1 | * | 3/2006 | Coffinberry | 60/226.1 |
| 2007/0220891 A1 | * | 9/2007 | Snyder et al. | 60/761 |

FOREIGN PATENT DOCUMENTS

EP 0620404 A1 10/1994

\* cited by examiner

*Primary Examiner*—Akm E Ullah
*Assistant Examiner*—Arun Williams
(74) *Attorney, Agent, or Firm*—William Scott Andes, Esq.; Armstrong Teasdale LLP

(57) ABSTRACT

A method facilitates assembling a gas turbine engine with a flameholder. The method comprises coupling at least one turning vane between a radially outer casing and a radially inner casing to form a flameholder, forming at least two slots that extend substantially radially through the outer and inner casings, coupling at least one fuel injector to the flameholder, and coupling the flameholder within the augmenter.

17 Claims, 5 Drawing Sheets

METHOD AND APPARATUS FOR ASSEMBLING A FLAMEHOLDER FOR AN AUGMENTER

BACKGROUND OF THE INVENTION

This invention relates generally to turbine engines, and more specifically, to flameholders used therein.

At least some know gas turbine engines used with aircraft include in serial flow communication a fan, compressor, combustor, high pressure turbine, and low pressure or booster turbine. High performance aircraft engines may also include an afterburner or augmenter at the engine's aft end for providing additional thrust when required. During engine operation, air compressed as it flows through the fan and compressor, is mixed with fuel in the combustor. The fuel/air mixture is ignited and the combustion gases are channeled downstream through the turbines which extract energy therefrom. The hot combustion gases are then discharged from the engine into an augmenter wherein a portion of the exhausted gas is mixed with fuel and reignited prior to being discharged from the engine through a variable area exhaust nozzle.

Known augmenters include an exhaust casing and liner which defines a combustion zone. Flameholders and fuel spraybars within the augmenters introduce additional fuel into the exhaust discharge from the turbine engine. Various types of flameholders are known and at least some augmenters include at least one circumferential flameholder. More specifically, such flameholders include V-shaped gutters which define regions of relatively low velocity in the otherwise high velocity core gases. The afterburner flame may be initiated within such low velocity regions.

At least one known augmenter includes an annular flameholder assembly that includes a row of swirl vanes mounted between radially outer and inner casings. Each of the swirl vanes has opposite pressure and suction sidewalls that each extend from a leading edge to a trailing edge. An aft end of each flameholder includes a generally planar aft panel that extends about the circumference of the flameholder to facilitate holding the flame during augmenter operation. An annular opening defined in an upstream side of the augmenter enables exhaust gases to flow into the flameholder. A flow restricting structure downstream from the annular opening meters an amount of air flow entering the flameholder.

However, in at least one known flameholder, the flow restricting structure creates a flow pattern that extends downstream to the fuel sprayers. The fuel and exhaust flow mixture in such flow patterns may migrate upstream and spontaneously combust within the flameholder. Over time, spontaneous combustions within the flameholder may reduce the useable life of the augmenter.

BRIEF DESCRIPTION OF THE INVENTION

In one aspect, a method facilitates assembling a gas turbine engine with a flameholder. The method comprises coupling at least one turning vane between a radially outer casing and a radially inner casing to form a flameholder, forming at least two slots that extend substantially radially through the outer and inner casings, coupling at least one fuel injector to the flameholder, and coupling the flameholder within the augmenter.

In another aspect, an augmenter for a gas turbine engine, including a flameholder is provided. The flameholder includes a radially outer casing, a radially inner casing, at least one turning vane extending radially between the outer and inner casings, and at least two slots that extend substantially radially through the outer and inner casings.

In a further aspect, a gas turbine engine is provided. The gas turbine engine system includes an augmenter, a flameholder including a radially outer casing, a radially inner casing, at least one turning vane extending between the outer and inner casings, and at least two slots extending substantially radially through the radially outer and inner casings.

DETAILED DESCRIPTION OF THE INVENTION

Figure 1:
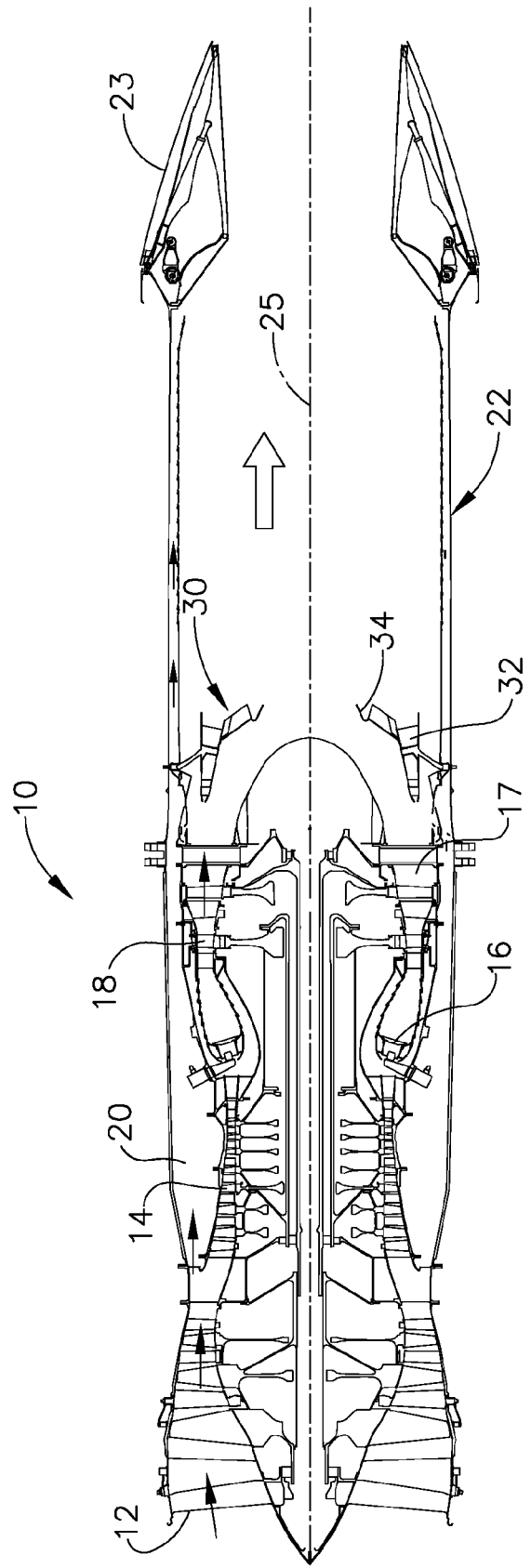
FIG. 1 is a cross-sectional view of an exemplary gas turbine engine that includes an augmenter.

FIG. 1 is a cross-sectional view of a gas turbine engine 10 including a low pressure compressor 12, a high pressure compressor 14, and a combustor 16. Engine 10 also includes a high pressure turbine 18, and a booster or low pressure turbine 17. An augmenter 22 extends downstream from low pressure turbine 17 to a variable area exhaust nozzle 23. Augmenter 22 includes a flameholder assembly 30 that in the exemplary embodiment, includes a radially outer flameholder 32 and radial inner flameholder 34. A center axis 25 extends through the center of engine 10 and augmenter 22.

In operation, air flows through low pressure compressor 12 and compressed air is supplied from low pressure compressor 12 to high pressure compressor 14. Highly compressed air is then delivered to combustor 16 and combustion gases flow from combustor 16 through turbines 17 and 18. Exhausted combustion gases enter augmenter 22 are mixed with fuel and bypass airflow 27 entering augmenter 22 from a bypass duct 20. The fuel/air mixture is reignited and the resulting combustion gases are channeled aftward through exhaust nozzle 23.

Figure 2:
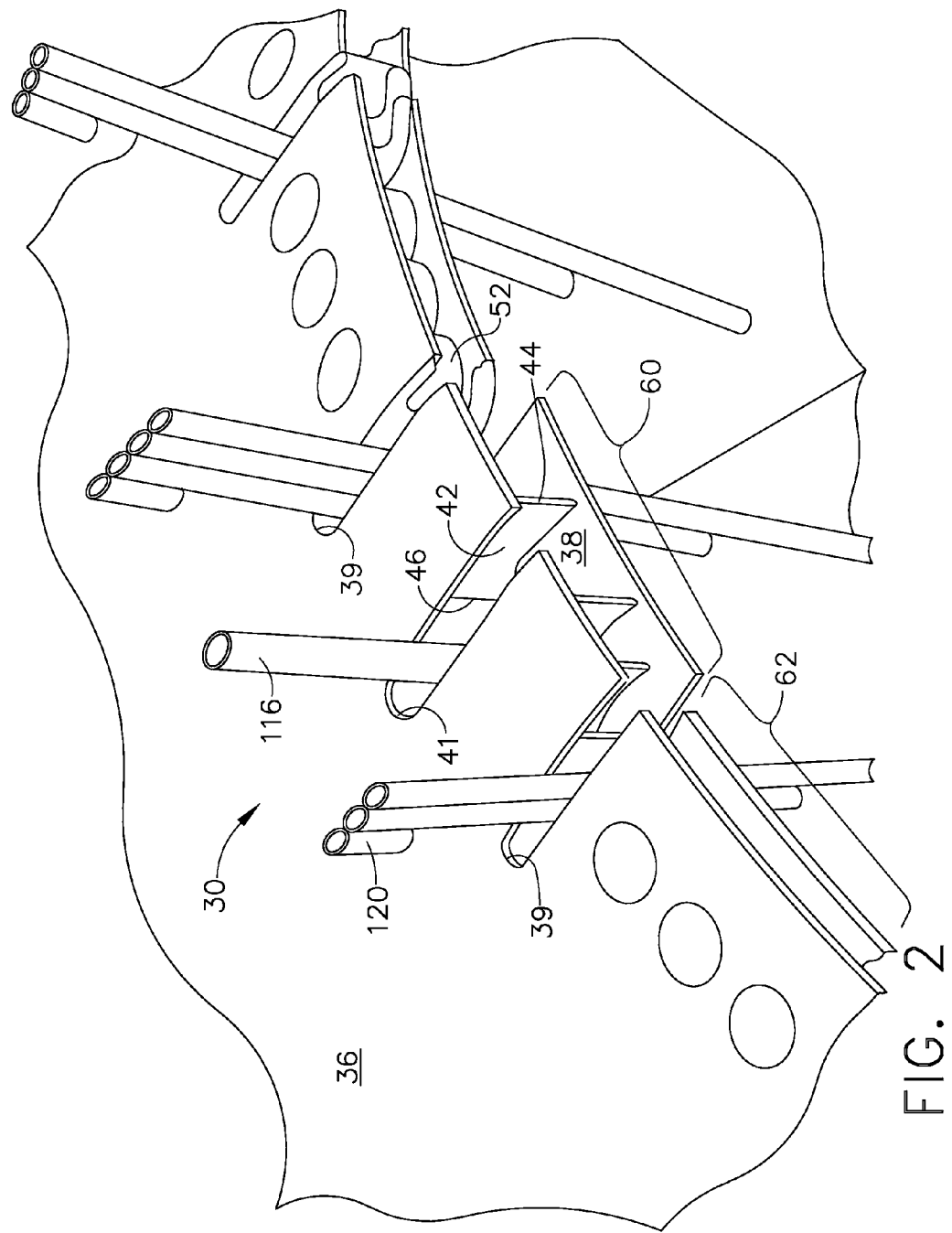
FIG. 2 is a perspective view of a flameholder that may be used with the augmenter shown in FIG. 1.
Figure 3:
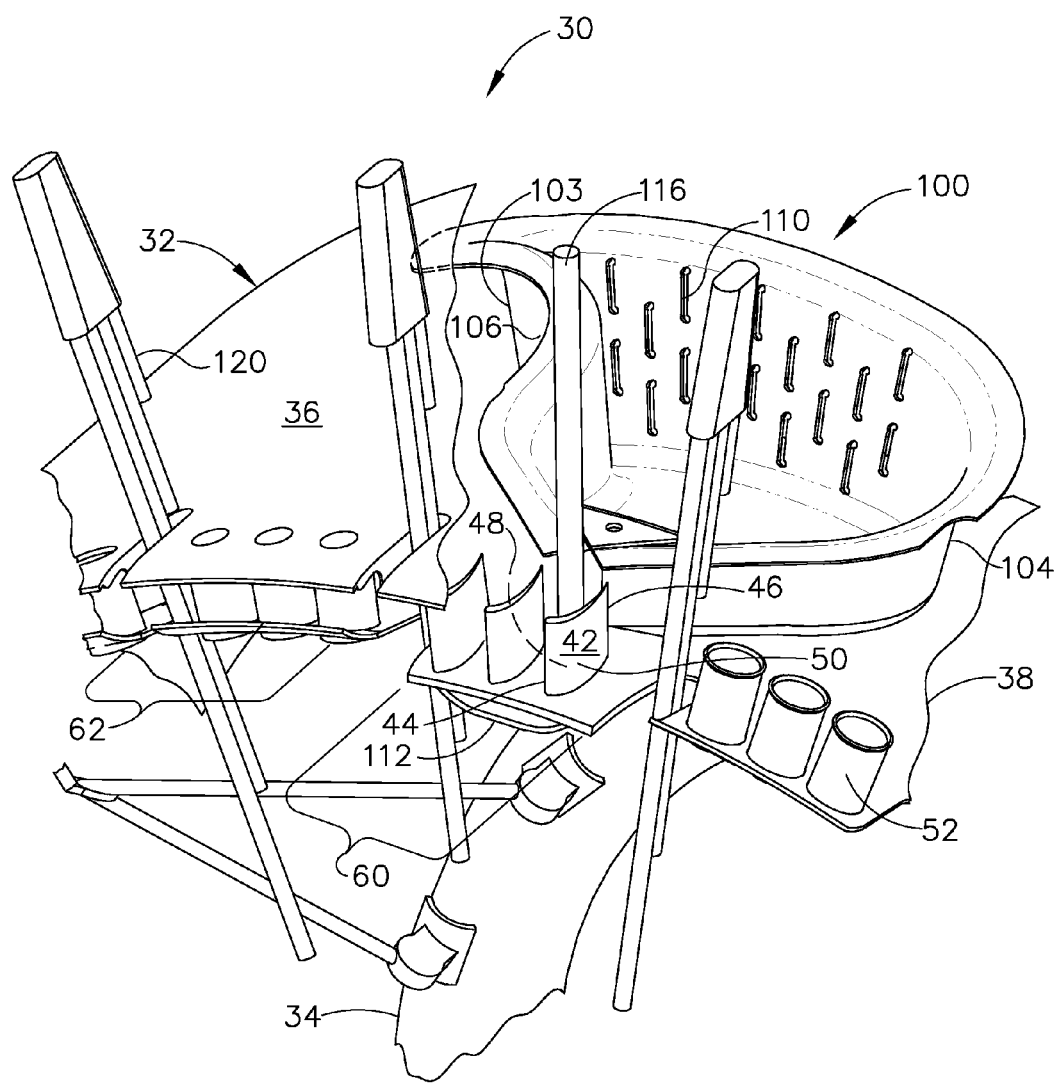
FIG. 3 is a perspective view of the flameholder shown in FIG. 2 and with an outer casing removed.
Figure 4:
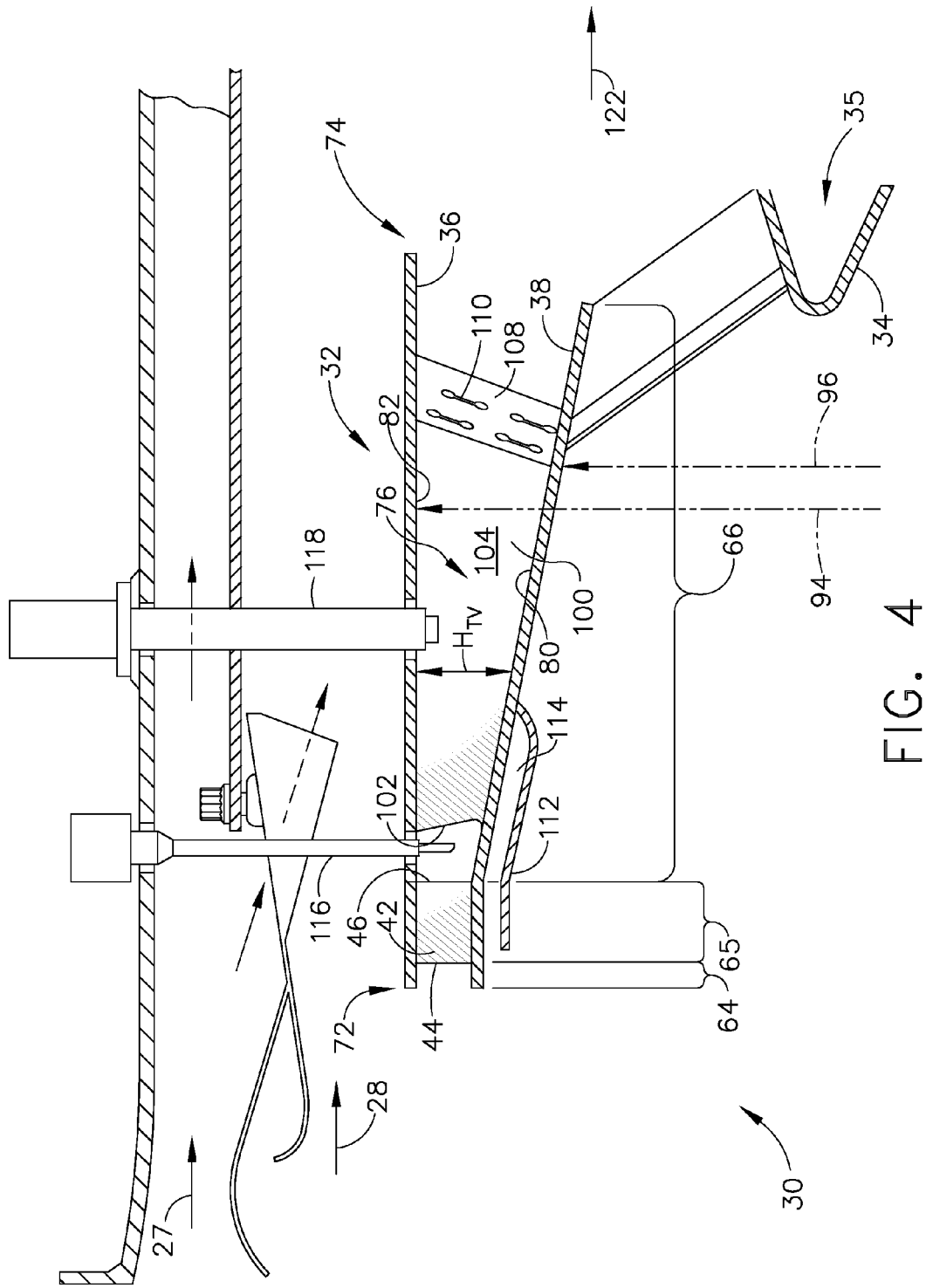
FIG. 4 is cross-sectional view of a portion of the flameholder shown in FIG. 2.
Figure 5:
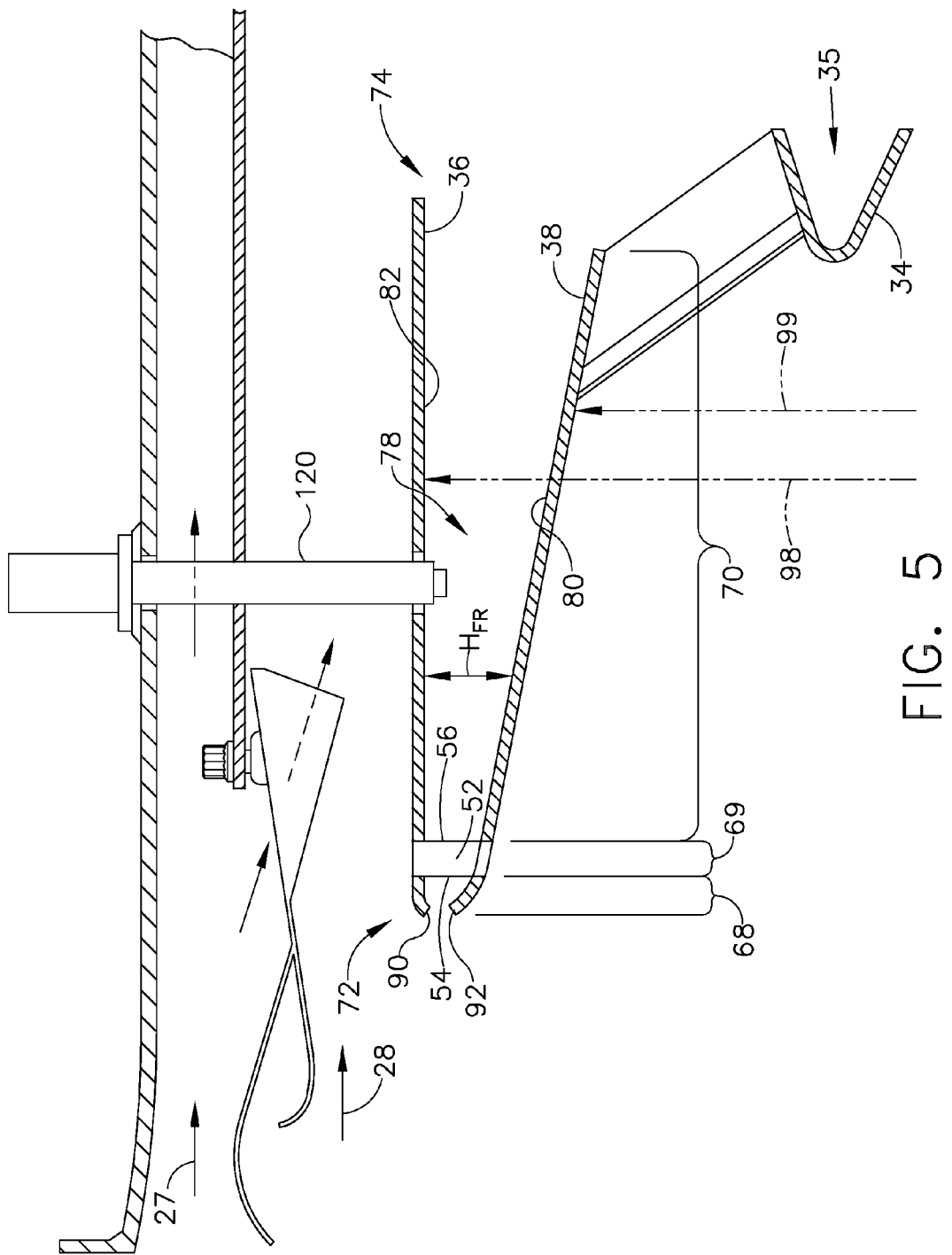
FIG. 5 is a cross-sectional view of another portion of the flameholder shown in FIG. 2.

FIG. 2 is a perspective view of annular flameholder assembly 30. FIG. 3 is a perspective view of a portion of flameholder assembly 30. FIG. 4 is a cross sectional view of flameholder assembly 30 including a turning vane 42. FIG. 5 is a cross sectional view of flameholder assembly 30 including a flow restrictor 52. In the exemplary embodiment, annular flameholder assembly 30 includes an outer flameholder 32 and an inner flameholder 34. Outer flameholder 32 includes a radially outer casing 36 and a radially inner casing 38. Radially outer casing 36 and radially inner casing 38 include a leading edge 72 and a trailing edge 74. A plurality of generally axially aligned slots 39 extend through outer and inner casings 36 and 38, respectively. More specifically in the exemplary embodiment, slots 39 are spaced circumferentially about flameholder assembly 30. In the exemplary embodiment, inner flameholder 34 includes an annular V-shaped gutter 35 which faces downstream.

A plurality of circumferentially-spaced turning vanes 42 and a plurality of circumferentially-spaced flow restrictors 52 extend between outer and inner casings 36 and 38, respectively. For example, in one embodiment, turning vanes 42 and flow restrictors 52 are coupled between outer and inner casings 36 and 38, respectively, via a braising process. More specifically, in the exemplary embodiment each pair of circumferentially-adjacent axial slots 39 generally divides the plurality of turning vanes 42 into groups 60 of turning vanes 42. In the exemplary embodiment, groups 60 are circumferentially-spaced about flameholder assembly 30. Moreover, each pair of circumferentially-adjacent axial slots 39 also generally divides the plurality of flow restrictors 52 into groups 62 of flow restrictors 52. In the exemplary embodiment, groups 62 are circumferentially-spaced about flameholder assembly 30. More specifically, in the exemplary embodiment, each group 62 of flow restrictors 52 is positioned between a circumferentially-adjacent pair of groups 60 of turning vanes 42.

In the exemplary embodiment, each turning vane 42 includes a leading edge 44, a trailing edge 46, a concave sidewall 48, and a convex sidewall 50 connected to leading edge 44 and trailing edge 46. In the exemplary embodiment, turning vane 42 leading edge 44 is downstream of inlet portion 64 leading edge 72. Moreover, each turning vane 42 is substantially equi-spaced circumferentially between outer and inner casings 36 and 38 respectively. In the exemplary an upstream embodiment, each flow restrictor 52 is generally cylindrical in shape and include upstream side 54 and a downstream side 56. Moreover, each flow restrictor 52 is substantially equi-spaced circumferentially between outer and inner casings 36 and 38 respectively. Other embodiments of flow restrictors 52 may include but are not limited to, semi-circular or rectangular structures.

Groups 60 of turning vanes 42, in the exemplary embodiment, are coupled within portions of flameholder 32 that define a turning vane flow passage 76 that includes an inlet portion 64 upstream from turning vanes 42, a discharge portion 66 downstream from turning vanes 42, and an intermediate portion 65 extending therebetween. Passage 76 has a height $H_{tv}$ measured from a radially outer surface 80 of inner casing 38 to a radially inner surface 82 of outer casing 36. In the exemplary embodiment, passage height $H_{tv}$ is substantially constant from inlet portion 64 through intermediate portion 65, and increases gradually from intermediate portion 65 through discharge portion 66. As such, outer casing 36 is formed with a substantially constant radius of curvature 94 from a leading edge 72 of inlet portion 64 to a trailing edge 74 of discharge portion 66. The radius of curvature is the radial distance measured from center axis 25 to either radially outer or radially inner casing 36 or 38. Moreover, in the exemplary embodiment, inner casing 38 is formed with a substantially constant radius of curvature 96 from leading edge 72 to turning vane trailing edge 46 and a gradually decreasing radius of curvature 96 within discharge portion 66, from turning vane trailing edge 46 to discharge portion 66 trailing edge 74.

Similarly, in the exemplary embodiment, groups 62 of flow restrictors 52 are positioned within portions of flameholder 32 that define a flow restrictor flow passage 78 that includes an inlet portion 68 upstream from flow restrictors 52, a discharge portion 70 downstream from flow restrictors 52, and an intermediate portion 69 extending therebetween. Flow restrictor flow passage 78 has a height $H_{fr}$ that is measured from inner casing outer surface 80 to outer casing inner surface 82. Moreover, in the exemplary embodiment, outer casing leading edge 90 is bent inward with respect to flow restrictor flow passage 78. Similarly, inner casing leading edge 92 is bent inward with respect to flow restrictor flow passage 78. As such, outer casing 36 is formed with a substantially constant radius of curvature 98 from flow restrictor upstream side 54 to disclosure portion trailing edge 74. Moreover, in the exemplary embodiment, inner casing 38 is formed with a radius of curvature 99 that gradually decreases from inlet portion leading edge 72 to discharge portion trailing edge 74. As such, height $H_{fr}$ increases gradually from inlet portion 68 through to discharge portion 70.

In the exemplary embodiment, a plurality of circumferentially-spaced swirl vanes 100 are defined between outer and inner casings 36 and 38. More specifically, in the exemplary embodiment, swirl vanes 100 are each defined downstream from each group 60 of turning vanes 42. Each swirl vane 100 includes a leading edge 102, a trailing edge 103, a suction side wall 104, a pressure side wall 106, and an aft panel 108 that includes a plurality of vents 110. Combustion gases 28 are channeled into each swirl vane 100 via a plurality of circumferentially-spaced scoops 112. More specifically, each scoop 112 defines a channel 114 which extends in flow communication a plurality of inlet apertures (not shown) defined within inner casing 38, and move specifically with an interior of swirl vane 100. Pressure wall 106 is generally concave from leading edge 102 to aft panel 108 and suction wall 104 is generally convex from leading edge 102 to aft panel 108. Swirl vanes 100 define a bluff body that facilitates enhancing flameholder capability.

Inserted radially through outer casing 36 is a pilot fuel injector 116 and an igniter 118. In the exemplary embodiment, pilot fuel injector 116 is downstream from turning vanes 42. More specifically, pilot fuel injector 116 is positioned within an aperture 41 defined within outer casing 36 and igniter 118 is downstream from pilot fuel injector 116. A plurality of main fuel spraybars 120 extend through axial slots 39.

During augmenter operation, exhausted combustion gases 28 enter augmenter 22 and flameholder 32 through inlet portions 64 and 68. Specifically, each inlet portion 68 meters an amount of flow channeled into groups 62 of flow restrictors 52, and each inlet portion 64 meters an amount of flow channeled into groups 60 of turning vanes 42. Generally more combustion gases 28 are channeled through inlet portion 64 than through inlet portions 68.

Combustion gases 28 entering inlet portion 64 are channeled turning vanes 42 downstream towards pilot fuel injector 116, wherein gases 28 are mixed with injected fuel. The gas/fuel mixture flows around each swirl vane 100 towards igniter 118 wherein the gas/fuel mixture is ignited to initiate an augmenter flame. Additional fuel is injected into flameholder 32 via main fuel spraybars 120. The augmenter flame is held by outer flameholders 32 and 34.

The ignition of the combustion gas/fuel mixture generates additional combustion gases 122 and additional thrust. To facilitate cooling flameholder 32 during augmenter operation, bypass flow from engine 10 channeled to flameholders 32 and 34. Specifically, bypass flow enters swirl vanes 100 via scoop channel 114 to facilitate cooling flameholder 32. Sport cooling flow is discharged from swirl vane 100 via discharge vents 110. The discharge of bypass combustion gases through discharge vents 110 facilitates thermally insulating flameholder 32 from exposure to hot combustion gases generated downstream from augmenter 22 during operation.

Turning vanes 42 facilitate producing a laminar flow of combustion gases 28 that facilitates preventing backflow and areas of low velocity. Combustion gases 28 mix with the injected fuel to form a combustion gas/fuel mixture in laminar flow. The laminar flow of the combustion gas/fuel mixture reduces areas of low velocity and the risk of the mixture backflowing upstream and spontaneously combusting.

Moreover, vanes 42 also facilitate reducing the possibility of turbulence, including wakes and eddies, being generated in the flow of the combustion gas/fuel mixture. Rather, turning vanes 42 facilitate creating a laminar flow of the combustion gas/fuel mixture which is less likely to migrate upstream and spontaneously combust.

In each embodiment, the above-described flameholder includes at least one turning vane that facilitates creating a laminar flow of a combustion gas/fuel mixture through the flameholder assembly. More specifically, in each embodiment, each turning vane facilitates reducing areas of low velocity of the combustion gas/fuel mixture within the flameholder. Moreover, during augmenter operation, the turning vanes facilitate preventing the combustion gas/fuel mixture from backflowing upstream and spontaneously combusting in the flameholder. Accordingly, augmenter performance and flameholder useful life are each facilitated to be enhanced in a cost effective and reliable means.

Exemplary embodiments of augmenters with flameholders are described above in detail. The turning vanes are not limited to use with the specific flameholder embodiments described herein, but rather, the turning vanes can be utilized independently and separately from other flameholder components described herein. Moreover, the invention is not limited to the embodiments of the turning vanes described above in detail. Rather, other variations of turning vane embodiments may be utilized within the spirit and scope of the claims.

While the invention has been described in terms of various specific embodiments, those skilled in the art will recognize that the invention can be practiced with modification within the spirit and scope of the claims.

What is claimed is:

1. A method for assembling a gas turbine engine including an augmenter, said method comprises:
    coupling a plurality of turning vanes between a radially outer casing and a radially inner casing to form a flameholder;
    forming at least two slots that extend substantially radially through the outer and inner casings such that the plurality of turning vanes are each positioned between the at least two slots;
    coupling the flameholder within the augmenter; and
    coupling the augmenter within the gas turbine engine.

2. A method in accordance with claim 1 further comprising coupling at least one flow restrictor between the radially outer casing and the radially inner casing.

3. A method in accordance with claim 1 further comprising coupling a plurality of circumferentially-spaced flow restrictors between the outer and inner casings such that the plurality of turning vanes are spaced circumferentially between a plurality of groups of circumferentially-spaced flow restrictors.

4. A method in accordance with claim 3 wherein coupling at least one turning vane between a radially outer and a radially inner casing further comprises:
    coupling the plurality of turning vanes within a portion of the flameholder having a substantially constant inlet height measured between the inner and outer casings; and
    coupling the plurality of flow restrictors within a portion of the flameholder including a divergent inlet defined between the inner and outer casings.

5. A method in accordance with claim 1 wherein coupling a plurality of flow restrictors further comprises positioning a plurality flow restrictors circumferentially between a plurality of groups of turning vanes.

6. An augmenter for a gas turbine engine, said augmenter comprising:
    a flameholder comprising a radially outer casing;
    a radially inner casing;
    a plurality of groups of turning vanes extending between said outer and inner casings and a plurality of groups of flow restrictors, each of said plurality of groups of flow restrictors is spaced circumferentially between circumferentially-spaced groups of turning vanes; and
    at least two slots that extend substantially radially through said outer and inner casings.

7. An augmenter in accordance with claim 6 wherein said flameholder further comprises at least one flow restrictor extending between said inner and outer casings.

8. An augmenter in accordance with claim 7 wherein said at least two slots divide said flameholder into a plurality of circumferentially-spaced groups of flow restrictors, each of said groups of flow restrictors comprises a plurality of flow restrictors.

9. An augmenter in accordance with claim 8 wherein said at least two slots divide said flameholder into at least one group of turning vanes that comprises a plurality of circumferentially-spaced turning vanes.

10. An augmenter in accordance with claim 9 wherein each of said groups of turning vanes is positioned within a section of said flameholder having a substantially constant first height measured between said radially outer and inner casings.

11. An augmenter in accordance with claim 9 wherein each of said plurality of groups of flow restrictors is positioned within a section of said flameholder having a second height between said radially outer and inner casings wherein the second height is different than the first height.

12. An augmenter in accordance with claim 6 further comprising a fuel injector wherein said fuel injector is substantially centered between said at least two slots downstream from said turning vanes.

13. A gas turbine engine comprising:
    an augmenter; and
    a flameholder coupled within said augmenter, said flameholder comprising a radially outer casing, a radially inner casing, a plurality of circumferentially-spaced groups of turning vanes extending between said outer and inner casings, a plurality of circumferentially-spaced groups of flow restrictors, each of said groups of flow restrictors is between a circumferentially adjacent air of groups of turning vanes, and at least two slots extending substantially radially through said outer and inner casings.

14. A gas turbine engine in accordance with claim 13 wherein said flameholder further comprises at least one flow restrictor extending between said outer and inner casings.

15. A gas turbine engine in accordance with claim 14 wherein said at least two slots divide said flameholder into at least one group of flow restrictors and at least one group of turning vanes, said at least one group of flow restrictors comprise a plurality of circumferentially-spaced flow restrictors, said at least one group of turning vanes comprises a plurality of circumferentially-spaced turning vanes.

16. A gas turbine engine in accordance with claim 15 wherein said at least one group of turning vanes comprises an inlet defined between said radially outer and inner casings, said inlet comprises a substantially constant height from a leading edge of said outer and inner casings to a trailing edge of said plurality of turning vanes.

17. A gas turbine engine in accordance with claim 15 wherein said at least one group of flow restrictors comprise an inlet defined between said radially outer and inner casings, said inlet is divergent such that a eight of said inlet upstream from said plurality of flow restrictors is shorter than a height of said inlet down stream from said plurality of flow restrictors.

* * * * *